US008675620B1

(12) United States Patent
Benveniste

(10) Patent No.: US 8,675,620 B1
(45) Date of Patent: Mar. 18, 2014

(54) SCHEDULED SERVICE PERIODS IN WIRELESS MESH NETWORKS

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1063 days.

(21) Appl. No.: 12/417,708

(22) Filed: Apr. 3, 2009
(Under 37 CFR 1.47)

Related U.S. Application Data

(60) Provisional application No. 61/052,667, filed on May 13, 2008, provisional application No. 61/052,896, filed on May 13, 2008.

(51) Int. Cl.
*H04W 4/00* (2009.01)

(52) U.S. Cl.
USPC ............................................... 370/338

(58) Field of Classification Search
USPC ......... 370/203, 204–215, 229–253, 310–337, 370/338–350, 395.1, 395.3, 395.4, 395.41, 370/395.42, 395.5, 395.52, 395.53, 370/412–421, 431–457, 458–463, 464–497, 370/498–522, 523–520, 521–529
See application file for complete search history.

(56) References Cited

U.S. PATENT DOCUMENTS

| | | | | |
|---|---|---|---|---|
| 7,085,595 | B2 * | 8/2006 | Kitchin | 455/574 |
| 7,369,518 | B2 * | 5/2008 | Lee | 370/311 |
| 7,412,265 | B2 * | 8/2008 | Chen et al. | 455/574 |
| 7,457,973 | B2 * | 11/2008 | Liu | 713/310 |
| 7,472,027 | B1 * | 12/2008 | Batcher et al. | 702/60 |
| 7,505,795 | B1 * | 3/2009 | Lim et al. | 455/574 |
| 7,508,781 | B2 * | 3/2009 | Liu et al. | 370/311 |
| 7,519,017 | B2 * | 4/2009 | Yi | 370/318 |
| 7,564,826 | B2 * | 7/2009 | Sherman et al. | 370/338 |
| 7,613,156 | B2 * | 11/2009 | Rittle et al. | 370/338 |
| 7,656,831 | B2 * | 2/2010 | Gao et al. | 370/311 |
| 7,684,835 | B1 * | 3/2010 | Vu et al. | 455/574 |
| 7,693,117 | B2 * | 4/2010 | Benveniste | 370/338 |
| 7,715,885 | B2 * | 5/2010 | Arunan et al. | 455/574 |
| 7,747,273 | B2 * | 6/2010 | Chou | 455/522 |
| 7,813,307 | B2 * | 10/2010 | Kakani | 370/311 |
| 7,853,274 | B2 * | 12/2010 | Qi et al. | 455/458 |
| 7,873,848 | B2 * | 1/2011 | Nakahara et al. | 713/320 |
| 7,881,322 | B1 * | 2/2011 | Benveniste | 370/414 |
| 7,881,755 | B1 * | 2/2011 | Mishra et al. | 455/574 |
| 7,885,244 | B2 * | 2/2011 | Bhatti et al. | 370/338 |
| 7,904,023 | B2 * | 3/2011 | Viitamaki et al. | 455/41.2 |
| 7,920,504 | B2 * | 4/2011 | Muqattash et al. | 370/318 |
| 7,924,766 | B2 * | 4/2011 | Sahinoglu et al. | 370/321 |
| 7,957,777 | B1 * | 6/2011 | Vu et al. | 455/574 |
| 7,961,659 | B2 * | 6/2011 | Zaks | 370/311 |
| 7,969,912 | B2 * | 6/2011 | Jeon et al. | 370/254 |
| 7,978,637 | B2 * | 7/2011 | Benveniste | 370/311 |
| 8,310,967 | B1 * | 11/2012 | Goel et al. | 370/311 |
| 2004/0166871 | A1 * | 8/2004 | Backes et al. | 455/453 |
| 2004/0190467 | A1 * | 9/2004 | Liu et al. | 370/311 |
| 2004/0264397 | A1 * | 12/2004 | Benveniste | 370/311 |

(Continued)

*Primary Examiner* — Jung-Jen Liu

(74) *Attorney, Agent, or Firm* — Anderson Gorecki & Rouille LLP

(57) ABSTRACT

A method, apparatus and computer program product in which a computer system functions as a mesh point (MP) and provides scheduled service periods in wireless mesh networks is presented. The MP enters a light sleep mode. The MP determines peers of itself and determines beacons for the peers of itself. The MP then enters an Awake state for the beacons of its peers.

21 Claims, 8 Drawing Sheets

(56) References Cited

U.S. PATENT DOCUMENTS

| | | | |
|---|---|---|---|
| 2005/0009578 A1* | 1/2005 | Liu .................. | 455/574 |
| 2005/0047357 A1* | 3/2005 | Benveniste .......... | 370/311 |
| 2006/0149980 A1* | 7/2006 | Zhong ............... | 713/320 |
| 2006/0193296 A1* | 8/2006 | Zhong et al. ......... | 370/338 |
| 2006/0251004 A1* | 11/2006 | Zhong et al. ......... | 370/318 |
| 2006/0285527 A1* | 12/2006 | Gao et al. ........... | 370/338 |
| 2007/0086471 A1* | 4/2007 | Igarashi et al. ....... | 370/412 |
| 2007/0141985 A1* | 6/2007 | Parkkinen et al. ..... | 455/41.2 |
| 2007/0184809 A1* | 8/2007 | Muqattash et al. .... | 455/343.1 |
| 2007/0206554 A1* | 9/2007 | Laroia et al. ......... | 370/338 |
| 2007/0211679 A1* | 9/2007 | Laroia et al. ......... | 370/338 |
| 2007/0211680 A1* | 9/2007 | Laroia et al. ......... | 370/338 |
| 2007/0248039 A1* | 10/2007 | Backes et al. ........ | 370/328 |
| 2007/0286136 A1* | 12/2007 | Rittle et al. .......... | 370/338 |
| 2008/0065884 A1* | 3/2008 | Emeott et al. ........ | 713/168 |
| 2008/0095091 A1* | 4/2008 | Surineni et al. ....... | 370/311 |
| 2008/0123577 A1* | 5/2008 | Jaakkola et al. ...... | 370/311 |
| 2009/0010190 A1* | 1/2009 | Gong ................ | 370/311 |
| 2009/0067373 A1* | 3/2009 | Kneckt et al. ........ | 370/328 |
| 2009/0124301 A1* | 5/2009 | Raissinia ............ | 455/574 |
| 2009/0268652 A1* | 10/2009 | Kneckt et al. ........ | 370/311 |
| 2009/0274082 A1* | 11/2009 | Wentink .............. | 370/311 |
| 2009/0279449 A1* | 11/2009 | Kneckt et al. ........ | 370/253 |
| 2010/0165896 A1* | 7/2010 | Gong et al. .......... | 370/311 |
| 2011/0085611 A1* | 4/2011 | Laroia et al. ......... | 375/260 |
| 2011/0122804 A1* | 5/2011 | Iyer et al. ........... | 370/311 |

* cited by examiner

SCHEDULED SERVICE PERIODS IN WIRELESS MESH NETWORKS

CROSS REFERENCE TO RELATED APPLICATIONS

The present application claims the benefit of U.S. Provisional Patent Application No. 61/052,667, filed on May 13, 2008, and U.S. Provisional Patent Application No. 61/052,896, filed on May 13, 2008, both of which are incorporated herein by reference in their entirety.

BACKGROUND

A wireless local area network (WLAN) typically includes an Access Point (AP) and one or more stations. APs and stations transmit data in units referred to as frames over a shared-communications channel. Frames transmitted from a station to an AP are referred to as uplink frames, and frames transmitted from an AP to a station are referred to as downlink frames. In a situation where two or more stations (or an AP and a station) transmit frames simultaneously, then one or more of the frames can become corrupted, referred to as a collision. As a result, Wireless Local Area Networks (WLANs) typically employ one or more protocols to ensure that a station or AP can gain exclusive access to the shared-communications channel for a predetermined interval of time in order to transmit its frames without collisions occurring. Certain wireless network protocols (e.g., Institute of Electrical and Electronics Engineers [IEEE] 802.11, etc.) provide for the AP to periodically broadcast a special frame called a beacon that can be heard by the stations in the BSA (basic service area), the area covered by the AP. The beacon contains a variety of information that enables the stations to establish and maintain communications in an orderly fashion, such as a timestamp, which enables stations to synchronize their local clocks, and signaling information (e.g., channel number, frequency hopping pattern, dwell time, etc.).

A station can prolong its battery life by powering off its radio when not transmitting or receiving. When a station powers off its radio, the station is said to enter the "doze" state or "sleep mode". A station wakes up from the doze state by powering on its radio to enter the "awake" state. While a station is in the doze state, it cannot transmit or receive signals, and is said to be asleep. A station that saves battery life by alternating between alert states and doze states is said to be in power save (PS) mode, and a station that employs PS mode is said to be a power saving station. While a station is asleep, the AP buffers any downlink frames for the station for eventual delivery when station is in the awake state.

One method for receiving buffered frames is described in the IEEE 802.11-1999 standard, and is referred to herein as the "legacy" power save method. In this method, an AP periodically includes a Traffic Indication Map (TIM) in the beacon to identify which stations in power-save mode have downlink frames waiting in the AP's buffer for transmission.

In accordance with legacy power save method, stations in the doze state wake up to receive beacons and check the TIM. If the TIM indicates that there are frames buffered for the station, the station will send a PS Poll to request delivery of a buffered frame. To use PS polls, a station listens to the TIM in a beacon to determine if the AP has buffered frames for the station. When there are buffered frames for the station at the AP, the station sends a PS Poll to the AP signaling to the AP that the station is awake and waiting to receive a buffered frame. The AP sends a buffered frame to the station. If the frame has the "More Data" bit set to 1, indicating that there are more buffered frames for the station, the station will send another PS Poll to get another buffered frame. This is repeated until the AP has no more frames for the station.

Another strategy for delivering buffered packets in the AP to the appropriate station is known as Automatic Power Save Delivery (APSD), wherein the delivery of downlink buffered frames occurs without the need for PS Polls to indicate that the PS station is awake and ready to receive transmitted frames. There are two types of APSD: (i) scheduled APSD and (ii) unscheduled APSD. The two APSD variants differ with respect to initiation of the 'service period', which is the time period during which the PS station is presumed awake and able to receive a frame transmitted by the AP. With scheduled APSD, the service period starts automatically— that is, without special signaling frames to notify the AP that a station is awake and ready to receive frames. With unscheduled APSD, the transmission of an uplink frame is sufficient to signal the start of the service period, i.e., that the station is awake and ready to receive transmitted frames. The unscheduled service period begins when the AP receives from the station a QoS Data/Null frame. The station may elect to limit the access category (AC) of the frame that may initiate a service period. The AC(s) of the frames that may initiate a service period are designated by the station to through signaling such as an APSD TSPEC Another feature of APSD relates to the termination of the service period, the time interval a PS station must remain awake. Unlike legacy power save, where a PS station may go to sleep after receiving a single frame from the AP, APSD requires a PS station to stay awake to receive several buffered frames, and go to back to sleep only when it is notified by the AP. The AP sets the EOSP (end of service period) bit to 1 in the last frame it transmits in order to signal to the station that it will not transmit any more frames downlink until the next service period. This signals the station that it can go back to sleep.

A mesh network is a network that employs one of two connection arrangements, full mesh topology or partial mesh topology. In the full mesh topology, each node is connected directly to each of the others. In the partial mesh topology, nodes are connected to only some, not all, of the other nodes. A mesh network may contain Mesh Points, Mesh Access Points (MAPs) and portals, collectively referred to as nodes. A portal is a gateway which provides an infrastructure mesh network access to a Distribution System (DS).

The ability to select the different physical channels to be used by the radios at the mesh points (MPs) as the channels become available simplifies channel assignment and/or increases throughput in a mesh. Channels become available when transmissions at nearby MPs complete. A MP can select a channel that is free at the time of arrival of new frames. A channel's idle/busy status can be tracked by each MP through the exchange of control frames that reserve time on different channels. The reservation control frames are exchanged between MPs on control radio(s). Each of the control radios is assigned a fixed physical channel, as communication with neighbor mesh points must remain constant in order to receive reservation messages, which arrive unscheduled. Traffic is carried on mesh traffic (MT) radios. If a MP does not have enough radios to accommodate mesh traffic, control radios may also carry mesh traffic, in addition to control traffic. Mesh traffic radios carry only mesh traffic (no control traffic). The physical channels assigned to mesh radios may change dynamically

SUMMARY

Conventional mechanisms such as the ones explained above suffer from a variety of deficiencies. One such deficiency in conventional networks is that, for a particular mesh point, if traffic travels in both directions, the awake period for the mesh point is defined to start at the beacon, which results in longer awake periods and increased power consumption.

Embodiments of the invention significantly overcome such deficiencies and provide mechanisms and techniques that provide power save features in 802.11e wireless local area networks. Embodiments of the present invention enhance the unscheduled APSD power-save method in 802.11e by causing a mesh point to enter an Awake state multiple times for beacons of peers of the mesh point.

In a particular embodiment of a computer-implemented method for scheduling service periods in wireless mesh networks in which a computer system functions as a mesh point (MP), the MP enters a light sleep mode. The MP then determines its peers. The MP next determines beacons for the peers of the MP and enters an Awake state multiple times during a period for the beacons of its peers.

Other embodiments include a computer readable medium having computer readable code thereon for scheduling service periods in wireless mesh networks including a plurality of mesh points (MPs). The medium comprises instructions for an MP for entering a light sleep mode. The medium further comprises instructions for the MP to determines its peers. The medium also includes instructions for the MP to determine beacons for its peers and instructions for entering an Awake state multiple times during a period for the beacons of its peers.

Still other embodiments include a mesh point, configured to process all the method operations disclosed herein as embodiments of the invention. In such embodiments, the mesh point includes a memory system, a processor, communications interface in an interconnection mechanism connecting these components. The memory system is encoded with a process that limits the length of a service period in a WLAN as explained herein that when performed (e.g. when executing) on the processor, operates as explained herein within the mesh point to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations that limits the length of a service period in a WLAN including an AP and at least one station as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention.

Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
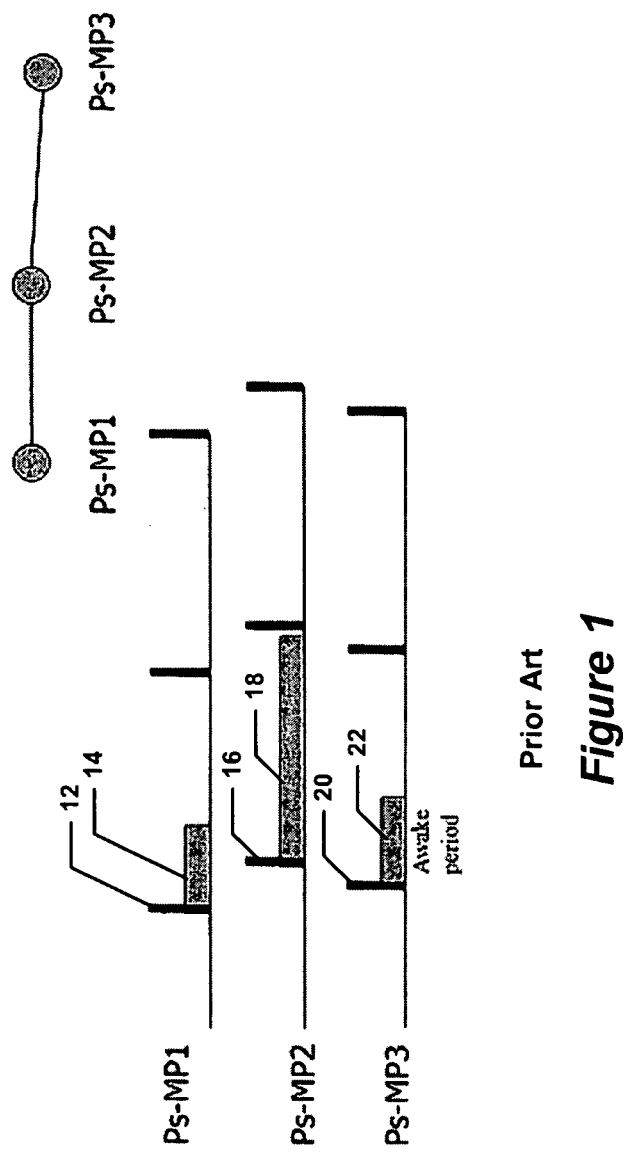
FIG. 1 depicts a block diagram of a first prior art wireless mesh network and timeline.

Referring to FIG. 1, a block diagram of a prior art WLAN environment and timing diagram in accordance with the present invention is shown. The environment includes a plurality of mesh points designated MP1, MP2 and MP3. All three mesh points are in power-save mode. An MP in power save mode remains awake for the duration of the awake window. While three mesh points are shown, it should be appreciated that any number of mesh points could be used. In this example, MP1 and MP3 are peers of MP2, but not of each other.

Referring to the timing diagram of FIG. 1, MP1 has a beacon 12 followed by an awake period 14. MP2 has a beacon 16 followed by an awake period 18, and MP3 has a beacon 20, followed by an awake period 22. In conventional wireless mesh networks like these, an MPs awake period starts at the beacon. In this example, MP2 has as its peers MP1 and MP3. MP3 cannot hear the TIM (included in the beacon 16) from MP2, since MP3 is not awake until after MP2's beacon 16 has occurred. MP3 thus is not aware if MP2 is going to receive traffic during its awake period, which could result in a collision.

Figure 2:
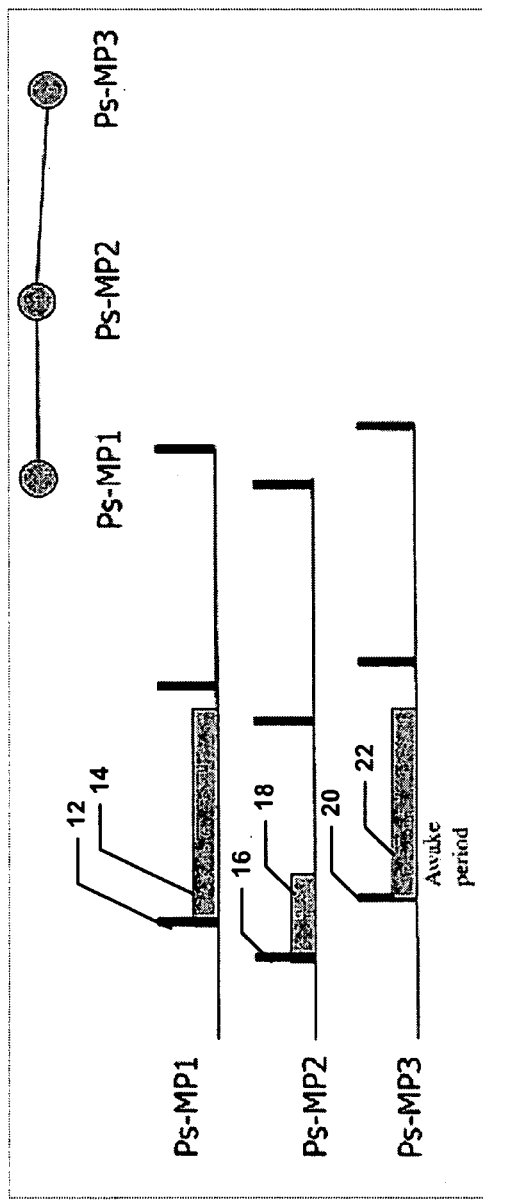
FIG. 2 depicts a block diagram of a second prior art wireless mesh network and timeline.

Referring to FIG. 2, a block diagram of a prior art WLAN environment and timing diagram in accordance with the present invention is shown. The environment is similar to that of FIG. 1, and includes a plurality of mesh points designated MP1, MP2 and MP3. All three mesh points are in power-save mode. An MP in power save mode remains awake for the duration of the awake window. In this example, MP1 and MP3 are peers of MP2, but not of each other.

Referring to the timing diagram of FIG. 2, MP1 has a beacon 12 followed by an awake period 14. MP2 has a beacon 16 followed by an awake period 18, and MP3 has a beacon 20, followed by an awake period 22. In conventional wireless mesh networks like these an MPs awake period starts at the beacon. In this example, MP2 has as its peers MP1 and MP3. MP3 and MP1 cannot hear the TIM from MP2, since MP3 and MP2 are not awake until after MP2's beacon 16 has occurred. MP3 and MP1 are not aware if MP2 is going to receive traffic during its awake period, which could result in collisions.

Figure 3:
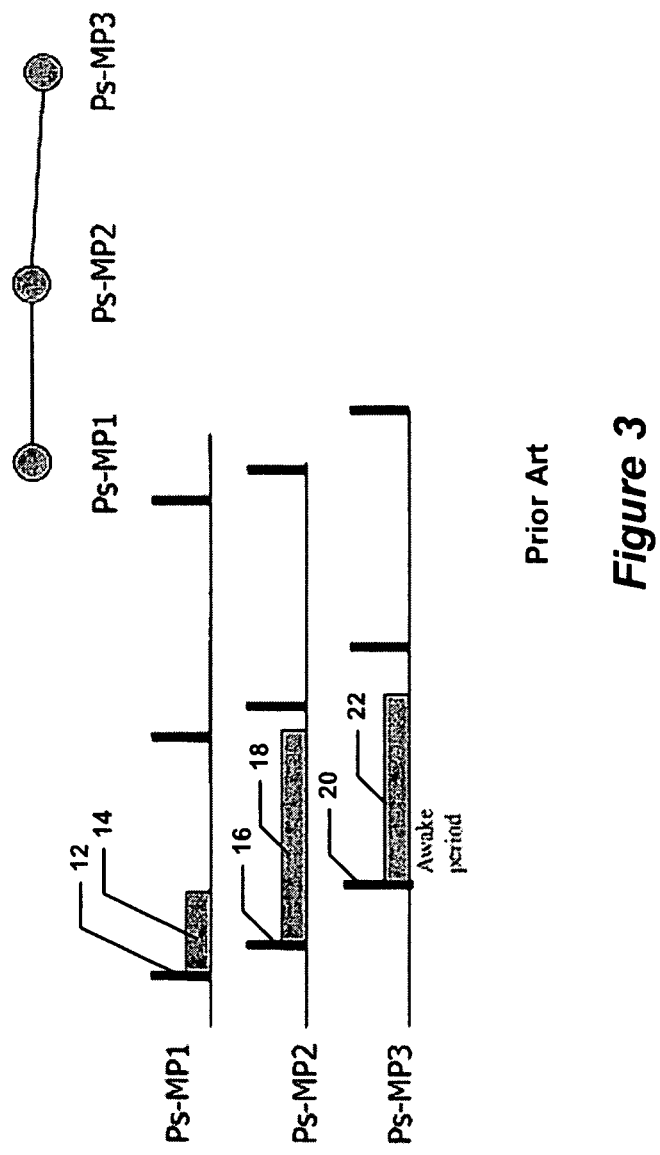
FIG. 3 depicts a block diagram of a third prior art wireless mesh network and timeline.

Referring to FIG. 3, a block diagram of a prior art WLAN environment and timing diagram in accordance with the present invention is shown. The environment is similar to that of FIGS. 1 and 2, and includes a plurality of mesh points designated MP1, MP2 and MP3. All three mesh points are in power-save mode. An MP in power save mode remains awake for the duration of the awake window. In this example, MP1 and MP3 are peers of MP2, but not of each other.

Referring to the timing diagram of FIG. 3, MP1 has a beacon 12 followed by an awake period 14. MP2 has a beacon 16 followed by an awake period 18, and MP3 has a beacon 20, followed by an awake period 22. In conventional wireless mesh networks like these an MPs awake period starts at the beacon. In this example, MP2 has as its peers MP1 and MP3. MP2 cannot hear the TIM from MP1 and MP3 cannot hear the TIM from MP2. MP2 is not aware if MP1 is going to receive traffic during its awake period, and MP3 is not aware if MP2 is going to receive traffic during its awake period, which could result in collisions.

Figure 4:
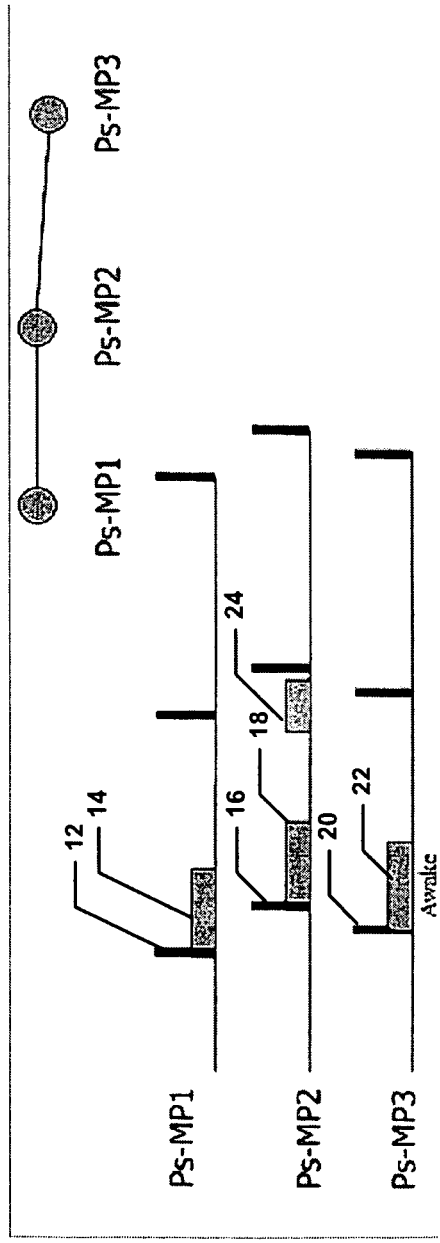
FIG. 4 depicts a block diagram of a first wireless mesh network and a timeline in accordance with embodiments of the invention.

Referring now to FIG. 4, the situations described in FIGS. 1-3 are avoided by way of a modified light sleep mode for power saving MPs. Each MP is placed in modified light sleep mode. The MPs can wake up multiple times in a period. In this example, MP2 wakes a first time 18 to hear MP3s beacon and also wakes up a second time 24 in the period, in order to hear MP1s beacon. MP3 wakes up a first time 22 right after its beacon and wakes up a second time 26 in order to hear MP2s beacon.

Figure 5:
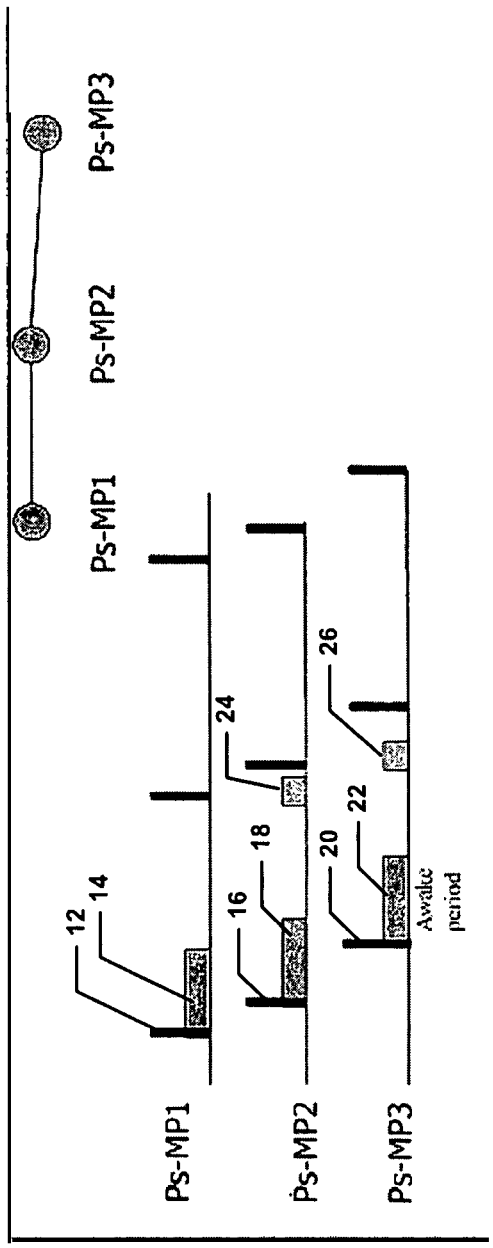
FIG. 5 depicts a block diagram of a second wireless mesh network and a timeline in accordance with embodiments of the invention.

Referring now to FIG. 5, each MP is placed in modified light sleep mode. The MPs can wake up multiple times in a period. In this example, MP2 wakes a first time 18 to hear MP3s beacon and also wakes up a second time 24 in the period, in order to hear MP1s beacon. MP3 wakes up a first time 22 right after its beacon and wakes up a second time 26 in order to hear MP2s beacon.

Figure 6:
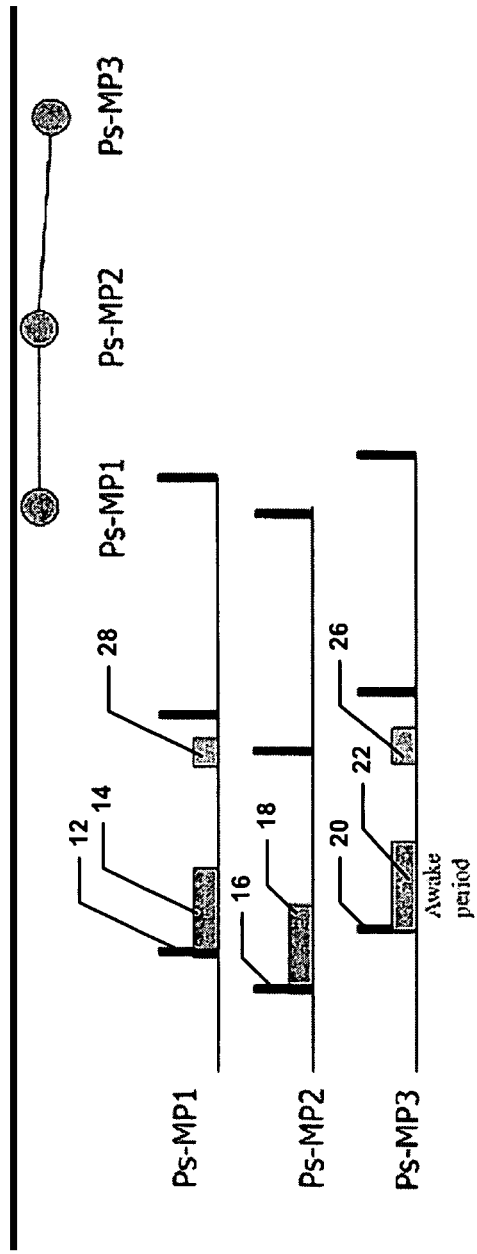
FIG. 6 depicts a block diagram of a third wireless mesh network and a timeline in accordance with embodiments of the invention.

Referring now to FIG. 6, each MP is placed in modified light sleep mode. The MPs can wake up multiple times in a period. In this example, MP2 wakes a first time 18 to hear MP3s beacon and also to hear MP1s beacon. MP1 wakes up a first time 14 and also wakes up a second time 28 in order to hear MP2s beacon. MP3 wakes up a first time 22 right after its beacon and wakes up a second time 26 in order to hear MP2s beacon.

Figure 7:
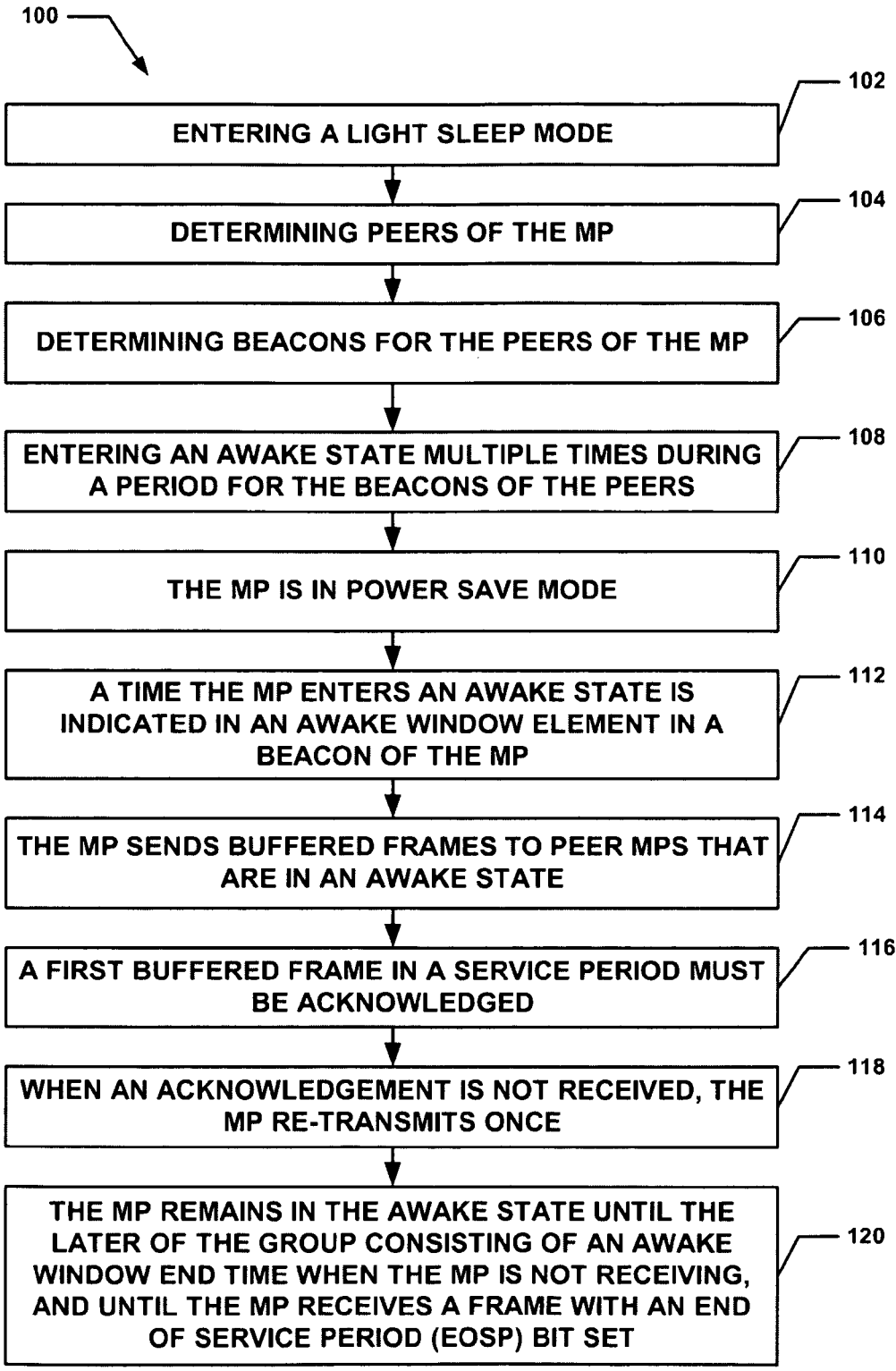
FIG. 7 comprises a flow diagram of a particular embodiment of a method of providing scheduled service periods in a wireless mesh network in accordance with embodiments of the invention.

A flow chart of a particular embodiment of the presently disclosed method is depicted in FIG. 7. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 7, a particular embodiment of a method 100 of providing scheduled service periods with a mesh point (MP) in wireless mesh networks is shown. Method 100 begins with processing block 102 which discloses the MP entering a light sleep mode. In a light sleep mode the MP is in an awake state for the beacons of its peers.

Processing block 104 states determining peers of the MP. A peer of an MP is another MP that is in the Basic Service Area (BSA) of the MP.

Processing block 106 recites determining beacons for the peers of the MP. A beacon is a broadcast that can be heard by the stations in the BSA. The beacon contains a variety of information that enables the stations to establish and maintain communications in an orderly fashion, such as a timestamp, which enables stations to synchronize their local clocks, signaling information, a Traffic Indication Map (TIM) and an Awake window element.

Processing block 108 discloses entering an Awake state multiple times during a period for the beacons of the peers. Processing block 110 states wherein the MP is in power save mode.

Processing block 112 states a time the MP enters an Awake state is indicated in an Awake Window element in a beacon of the MP. An Awake element includes an element identification (ID) field, a length field, an awake window field, an awake window end field and a maximum Peer Service Period (PSP) length field. The awake window field contains a duration value of the awake window. The awake window end field includes the time the awake window ends relative to the beacon time. The maximum PSP length field contains the value of the maximum length of a peer service period. An MP may limit the duration of a service period by setting the maximum PSP length field. The maximum PSP field may vary over time at each beacon.

Processing block 114 recites wherein the MP sends buffered frames to peer MPs that are in an Awake state. Processing block 116 discloses wherein a first buffered frame in a service period must be acknowledged. As further shown in processing block 118 when an acknowledgement is not received, the MP re-transmits once.

Processing block 120 states the MP remains in said Awake state until the later of the group consisting of an Awake Window end time when said MP is not receiving, and until said MP receives a frame with an End Of Service Period (EOSP) bit set.

Figure 8:
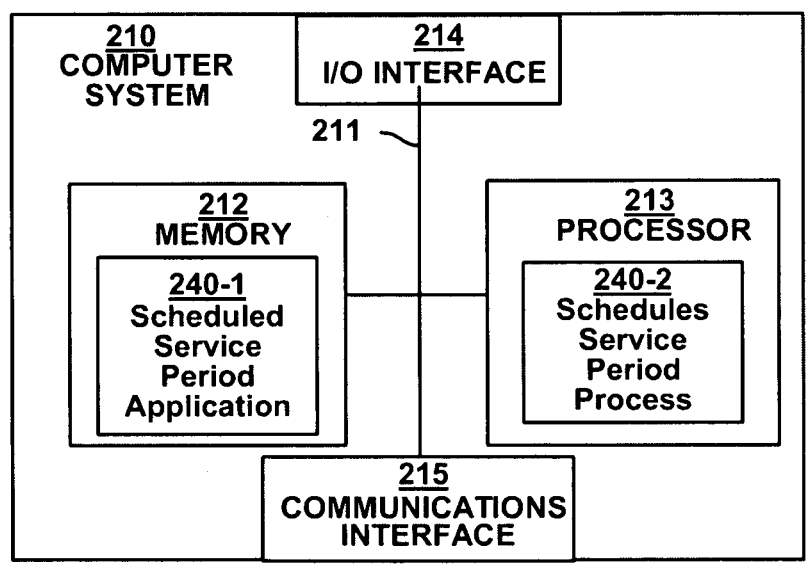
FIG. 8 illustrates an example computer system architecture for a computer system configures as a mesh point that provides scheduled service periods in a wireless mesh network in accordance with embodiments of the invention.

FIG. 8 is a block diagram illustrating example architecture of a computer system 110 that executes, runs, interprets, operates or otherwise performs a scheduled service period application 140-1 and scheduled service period process 140-2 suitable for use in explaining example configurations disclosed herein. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that the scheduled service period application 140-1 and process 140-2 provides on the display 130. Essentially, the graphical user interface 160 is where the customer 108-1 performs their 'online banking', specifying which bills are to be paid electronically, when those bills are to be paid, and the amount to be paid. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a scheduled service period application 140-1 as explained herein. The scheduled service period application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a scheduled service period application 140-1. Execution of a scheduled service period application 140-1 in this manner produces processing functionality in the scheduled service period process 140-2. In other words, the scheduled service period process 140-2 represents one or more portions or runtime instances of a scheduled service period application 140-1 (or the entire a scheduled service period application 140-1) performing or executing within or upon the processor 113 in the computerized device 110 at runtime.

It is noted that example configurations disclosed herein include the scheduled service period application 140-1 itself (i.e., in the form of un-executed or non-performing logic instructions and/or data). The scheduled service period application 140-1 may be stored on a computer readable medium (such as a floppy disk), hard disk, electronic, magnetic, optical, or other computer readable medium. A scheduled service period application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a scheduled service period application 140-1 in the processor 113 as the scheduled service period process 140-2. Those skilled in the art will understand that the computer system 110 may include other processes and/or software and hardware components, such as an operating system not shown in this example.

A display 130 need not be coupled directly to computer system 110. For example, the scheduled service period application 140-1 can be executed on a remotely accessible computerized device via the network interface 115. In this instance, the graphical customer interface 160 may be displayed locally to a customer 108 of the remote computer, and execution of the processing herein may be client-server based.

During operation, processor 113 of computer system 100 accesses memory system 112 via the interconnect 111 in order to launch, run, execute, interpret or otherwise perform the logic instructions of the scheduled service period application 140-1. Execution of scheduled service period application 140-1 produces processing functionality in scheduled service period process 140-2. In other words, the scheduled service period process 140-2 represents one or more portions of the scheduled service period application 140-1 (or the entire application) performing within or upon the processor 113 in the computer system 100.

It should be noted that, in addition to the scheduled service period process 140-2, embodiments herein include the scheduled service period application 140-1 itself (i.e., the un-executed or non-performing logic instructions and/or data). The scheduled service period application 140-1 can be stored on a computer readable medium such as a floppy disk, hard disk, or optical medium. The scheduled service period application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of scheduled service period application 140-1 in processor 113 as the scheduled service period process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system functions as a mesh point (MP) and said MP performs operations comprising:
    entering a light sleep mode;
    determining peers of said MP;
    determining beacons for said peers of said MP; and
    entering an Awake state multiple times during a period for said MP, said multiple awake states allowing said MP to hear said beacons of said peers, wherein said period for said MP starts at a beacon of said MP.

2. The method of claim 1 wherein a time said MP enters an Awake state is indicated in an Awake Window element in a beacon of said MP.

3. The method of claim 1 wherein said MP sends buffered frames to peer MPs that are in an Awake state.

4. The method of claim 3 wherein a first buffered frame in a service period must be acknowledged.

5. The method of claim 4 wherein when an acknowledgement is not received, said MP re-transmits once.

6. The method of claim 1 wherein said MP remains in said Awake state until the later of the group consisting of an Awake Window end time when said MP is not receiving, and until said MP receives a frame with an End Of Service Period (EOSP) bit set.

7. A non-transitory computer readable storage medium having computer readable code thereon for scheduling service periods in wireless mesh networks, the medium including instructions in which a computer system functions as a Mesh Point (MP), and wherein said MP performs operations comprising:
    entering a light sleep mode;
    determining peers of said MP;
    determining beacons for said peers of said MP; and
    entering an Awake state multiple times during a period for said MP, said multiple awake states allowing said MP to hear said beacons of said peers, wherein said period for said MP starts at a beacon of said MP.

8. The computer readable storage medium of claim 7 further including instructions wherein a time said MP enters an Awake state is indicated in an Awake Window element in a beacon of said MP.

9. The computer readable storage medium of claim 7 further including instructions wherein said MP sends buffered frames to peer MPs that are in an Awake state.

10. The computer readable storage medium of claim 9 further including instructions wherein a first buffered frame in a service period must be acknowledged.

11. The computer readable storage medium of claim 10 further including instructions wherein when an acknowledgement is not received, said MP re-transmits once.

12. The computer readable storage medium of claim 7 further including instructions wherein said MP remains in said Awake state until the later of the group consisting of an Awake Window end time when said MP is not receiving, and until said MP receives a frame with an End Of Service Period (EOSP) bit set.

13. A Mesh Point (MP) comprising:
    a memory;
    a processor;
    a communications interface;
    an interconnection mechanism coupling the memory, the processor and the communications interface; and
    wherein the memory is encoded with an application providing scheduled service periods in wireless mesh networks, that when performed on the processor, provides a process for processing information, the process causing the MP to perform the operations of:

entering a light sleep mode;

determining peers of said MP;

determining beacons for said peers of said MP; and entering an Awake state multiple times during a period for said MP, said multiple awake states allowing said MP to hear said beacons of said peers, wherein said period for said MP starts at a beacon of said MP.

14. The MP of claim 13 wherein a time said MP enters an Awake state is indicated in an Awake Window element in a beacon of said MP.

15. The MP of claim 13 wherein said MP sends buffered frames to peer MPs that are in an Awake state.

16. The MP of claim 15 wherein a first buffered frame in a service period must be acknowledged.

17. The MP of claim 16 wherein when an acknowledgement is not received, said MP re-transmits once.

18. The MP of claim 13 wherein said MP remains in said Awake state until the later of the group consisting of an Awake Window end time when said MP is not receiving, and until said MP receives a frame with an End Of Service Period (EOSP) bit set.

19. The method of claim 1 wherein traffic travels in both directions for said MP.

20. The computer readable medium of claim 7 wherein traffic travels in both directions for said MP.

21. The MP of claim 13 wherein traffic travels in both directions for said MP.

* * * * *